United States

Takesi et al.

[11] 4,099,845
[45] Jul. 11, 1978

[54] ZOOM LENS WITH ABERRATION VARIATION PREVENTED FOR FOCUSING

[75] Inventors: Kunio Takesi; Kazuo Tanaka, both of Tokyo, Japan

[73] Assignee: Canon Kabushiki Kaisha, Tokyo, Japan

[21] Appl. No.: 746,203

[22] Filed: Dec. 1, 1976

[30] Foreign Application Priority Data

Dec. 4, 1975 [JP] Japan .................. 50-144664

[51] Int. Cl.² ............................................ G02B 15/14
[52] U.S. Cl. .................... 350/184; 350/176; 350/177
[58] Field of Search ............... 350/184, 186, 176, 177

[56] References Cited

U.S. PATENT DOCUMENTS 3,598,476 8/1971 Merigold ..................... 350/186

*Primary Examiner*—Paul A. Sacher
*Attorney, Agent, or Firm*—Toren, McGeady and Stanger

[57] ABSTRACT

A focusing part in a wide-angle zoom lens. The focusing section of a wide angle zoom lens is composed, from the object end, of a diverging fixed lens group, a converging movable lens group and a converging fixed lens group. The movable lens group remains stationary during a zooming operation and moves along its optical axis toward an image when focusing from a distant object onto a nearer object. Aberrations remain unvaried even when focusing onto a nearby object. The converging fixed group furnishes a suitably positioned object point for a zooming section arranged behind the focusing section. The converging fixed lens group is composed of a plurality of lenses contributing to improvement in the image quality.

4 Claims, 9 Drawing Figures

ZOOM LENS WITH ABERRATION VARIATION PREVENTED FOR FOCUSING

BACKGROUND OF THE INVENTION

This invention relates to a variable focal length lens of the type called a zoom lens which is used for photographic and TV cameras, and particularly to a variable focal distance lens equipped with a movable focusing lens group suitable for a lens system having a wide angle of field.

More specifically stated, the invention relates to a variable focal distance lens system comprising three parts including a zooming part consisting of a plurality of movable lenses which are provided for continuously varying the focal distance of the whole lens system within a preset range while the location of an image surface for any desired object is kept unvaried; a focusing part which is disposed ahead of the zooming part (on the object side) and serves to provide an object point (an image point of a photographing object) unvarying relative to the zooming part irrespective of variation in the distance to the object; and an image forming lens part (relay lens) which is disposed behind the zooming part (on the image side), the lens system being arranged to satisfactorily correct aberration at every distance to objects and at every zoom position.

It is a recent requirement to make shorter the short focal distance side in the variable focal distance range of a zoom lens for a wider angle of field. To meet such requirement, the lens aperture of the focusing part must be increased. Besides, the construction of the lens becomes complex. In other words, in order to secure an effective diameter required, the outer diameter of the lens must be increased; furthermore, aberration correction is required not only over the magnification changing range but also covering the whole range of focusing from an infinite distance to a short distance; and this results in a complex lens construction. Thus, the ratio of the lens weight of the focusing part to the whole lens system greatly increases. In addition to such, compared with the conventional arrangement, the weight of the mechanism to be used for moving the lens group for focusing also becomes very heavy. Such problems present difficulty in making the lens system smaller and lighter. In view of such difficulty, there have been known lens systems of the type which, instead of drawing out a whole front lens part, is composed of a movable part for focusing and a fixed part for aberration correction. Such known systems include a system disclosed in British Pat. No. 975160 wherein the front lens part is composed of a negative lens group and a positive lens group and only the negative lens group is moved on the optical axis; and a system disclosed in U.S. Pat. No. 3598476 wherein the front lens part is composed of a negative lens group, a positive lens group and another negative lens group and only the positive lens group which is disposed in the middle is moved toward an object as the distance to the object becomes shorter.

SUMMARY OF THE INVENTION

It is the principal object of this invention to provide a variable focal distance lens having a focusing lens part wherein a movable portion for focusing is lighter in weight, smaller in size and simpler in construction and, particularly, the angle of field on the short focal distance side is made to be wide to ensure good image quality although designing for such arrangement has hitherto been considered difficult.

The construction contrived by this invention includes a zooming part consisting of a plurality of lens which is movable on the optical axis for zooming; a fixed lens group which is disposed behind the zooming part; and a front lens part which is disposed in front of the zooming part. In the front lens part, there are disposed, in order from the front end, a diverging lens group, a convergent movable lens group and a convergent lens group. The front lens part is as a whole convergent throughout the whole focusing range. The convergent movable lens group is moved backward on the optical axis for focusing as the distance to an object decreases. With an image of an object formed by said divergent lens group regarded as an object for the zooming part, the movable lens group is arranged to be a magnifying system with lateral magnification set to be $|\beta| > 1$. In the front lens part, the fixed converging lens group disposed in the rear thereof serves not only to correct aberrations but also to converge the light emitted through the converging movable lens group when such light is divergent, and also serves to form an object point at a most suitable point for the zooming part, even if the light is convergent.

DESCRIPTION OF PREFERRED EMBODIMENT

Figure 1:
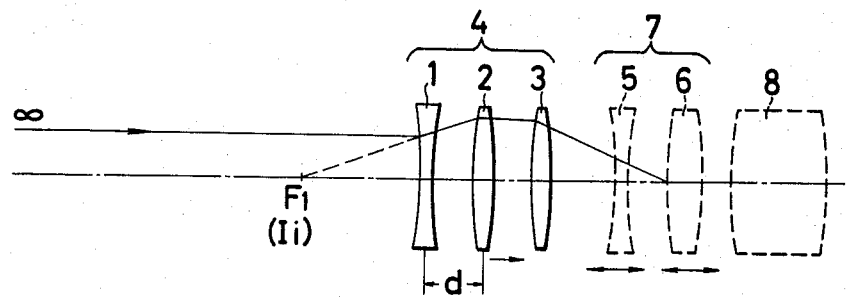
FIGS. 1 and 2 schematically illustrate the principle of the invention.
Figure 2:
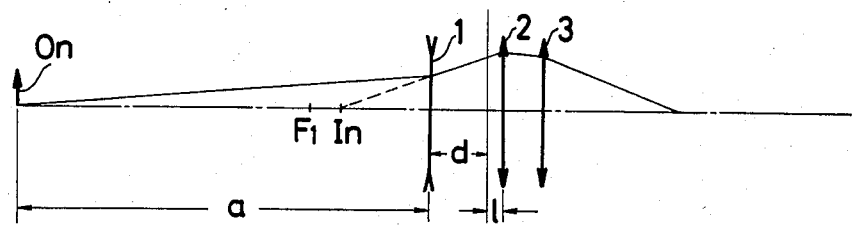

The details of this invention will be understood from the following description of a preferred embodiment of the invention with reference to the accompanying drawings, wherein: FIG. 1 illustrates condition in which focusing on object located at an infinite distance and FIG. 2 a condition in which focusing is made on an object located at a short distance within a normal photographing range. In FIGS. 1 and 2, a diverging fixed lens group 1, a converging movable lens group 3, and a converging lens group together form a front lens section, portion or part 4. A zooming section or part 7 is composed of a variator 5 and a compensator 6. A reference numeral 8 indicates an image forming stationary lens group. A reference symbol F1 indicates the position of a virtual image which the diverging lens group 1 forms of an object located at an infinite distance, i.e. the focal point of the diverging lens group 1. A distance d separates a principal point at the rear of the diverging lens group 1 and a principal point at the front of the converging movable lens group 2 while focusing on an object located at an infinite distance. A distance $a$ is the distance between a nearby object On and a principal point in the front of the diverging lens group 1. A virtual image of the nearby object On formed by the diverging lens group 1 at the position In. The reference character l represents the distance the converging movable lens group 2 is moved along the optical axis for focusing on the nearby object from the point at which the lens focuses on an object located at an infinite distance.

As shown in FIG. 2, for focusing on an object On which is located at finite distance, the converging movable lens group 2 is moved backward (image side) from a position at which focusing is made on an infinite distance. With an image In formed by the diverging fixed lens group regarded as an object, this type of focusing is possible where the converging movable lens group 2 behaves as a magnifying system for such an object, because: For focusing on a nearby object using an ordinary photographing lens (a contraction system), the lens is drawn out forward. Then, assuming that the relation of the object to an image is reversed, focusing on a nearer object can be made by drawing the lens inward. In this case, the relation of the lens to the object can be understood as forming a magnifying system.

The front lens part 4 as a whole forms a convergent system. With the diverging lens group 1, the converging lens group 2 and another converging lens group 3 arranged in sequence, the converging lens group 2 is movable for focusing on objects located within a normal photographing range while other groups are stationary to satisfy the following relations:

$$0 < |f_1| + d < 2f_2$$

$$0 < \left|\frac{af_1}{a+f_1}\right| + d + l < 2f_2$$

wherein $f_1$ represents the focal distance of the diverging lens group 1, $f_2$ the focal distance of the converging movable lens group 2 and $af_1/(a + f_1)$ a distance between an image In of a nearby object and the diverging lens group 1.

Under the above mentioned two conditions, when a distance between an image (Ii, In) formed by the diverging lens group and the converging movable lens group 2 is less than $f_2$, the image formed by the converging movable lens group 2 becomes a virtual image and when it is above $f_2$ and below $2f_2$, it becomes a real image. Further, it is preferable that the lens design meets the following conditions:

$$0.7f < f_3 < 2f$$

$$0.8|f_1| < f_2 < 4|f_1|$$

wherein $f$ represents a composite focal distance of the front lens part when focusing on an infinite distance and $f_3$ a focal distance of the stationary converging lens group.

Figure 3:
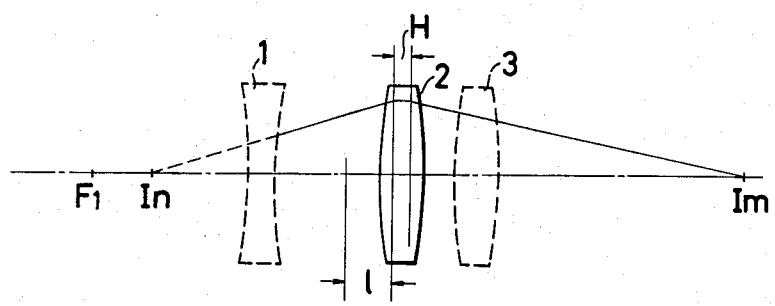
FIG. 3 illustrates a front lens part which performs a focusing action.
Figure 4A:
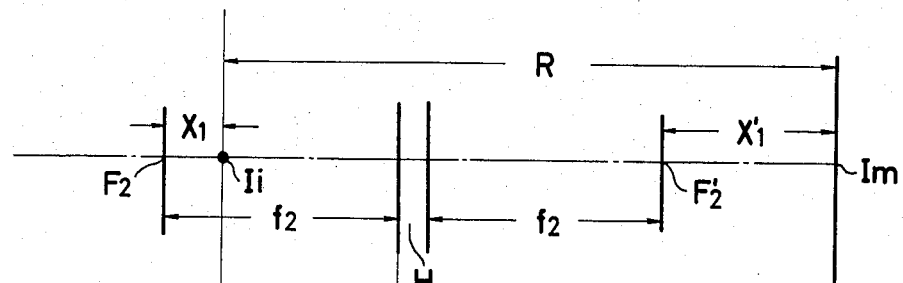
FIGS. 4A and 4B optically illustrate the focusing action.

Referring now to FIG. 3 and FIG. 4(A) and (B), the moving distance l of the converging movable lens group 2 is explained as follows: In these drawings, a reference symbol H indicates the distance between principal points of the converging lens group; R indicates a distance between an image Ii of an object formed by the diverging lens group 1 and an image Im formed by the converging movable lens group 2 when focusing on an infinite distance; and R' indicates the distance between an image Ii of a nearby object formed by the diverging lens group 1 and an image Im formed by the converging movable lens group 2 when focusing is made on the nearby object. The position of the image Im must be kept unvaried irrespective of the distance to the object.

In FIG. 4(A), assuming that the distance between the front focal point F2 of the converging movable lens group and an image point Ii is X1 and that the distance between the rear focal point F'2 and an image point Im is X'1, the following relations obtain from the optical formula of Newton:

$$X1 \cdot X'1 = -(f_2)^2 \quad (1)$$

and $$R = H + 2f_2 + X'1 - X1 \quad (2)$$

Figure 4B:
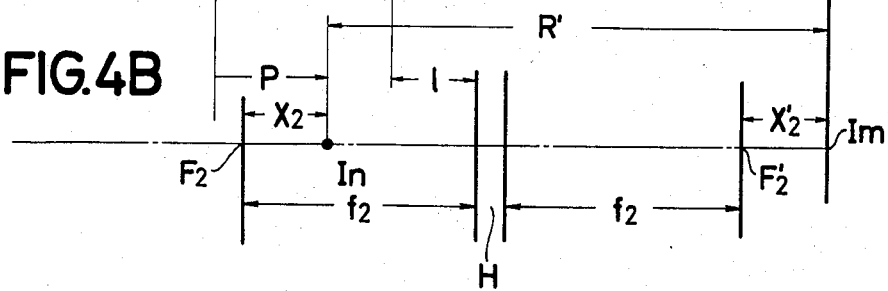

Referring to FIG. 4(B), assuming that a distance between the front focal point F2 and the image point In is X2 and that a distance between the rear focal point F'2 and the image point Im is X'2, there obtain the following relations:

$$X2 \cdot X'2 = -(f_2)^2 \quad (3)$$

$$R' = H + 2f_2 + X'2 - X2 \quad (4)$$

and $$X'1 = l + X'2 \quad (5)$$

$$R - R' = P \quad (6)$$

wherein P represents a distance between the image points Ii and In.

In the formulas (1) through (6) indicated above, the following derives from the formulas (1) and (2):

$$X'1 = \frac{1}{2}(R - H - 2f_2)\left\{1 + \sqrt{1 - \left(\frac{2f_2}{R - H - 2f_2}\right)^2}\right\}$$

The following derives from the formulas (3), (4) and (6):

$$X'2 = \frac{1}{2}(R' - H - 2f_2)$$

$$\left\{1 + \left(\sqrt{1 - \frac{2f_2}{R' - H - 2f_2}}\right)^2\right\}$$

$$= \frac{1}{2}(R - P - H - 2f_2)$$

$$\left\{1 + \sqrt{1 - \left(\frac{2f_2}{R - P - H - 2f_2}\right)^2}\right\}$$

The following derives from the formula (5):

$$l = \frac{1}{2}\left\{P + (R - H - 2f_2)\sqrt{1 - \left(\frac{2f_2}{R - H - 2f_2}\right)^2} - (R - P - H - 2f_2)\sqrt{1 - \left(\frac{2f_2}{R - P - H - 2f_2}\right)^2}\right\}$$

In other words, the moving distance l can be obtained from the above formula. In accordance with the embodiment example of this invention described hereinafter, distances a to objects and the moving distances l corresponding thereto are obtained as shown below:

| a | ∞ | 10000 | 3000 | 15000 | 700 | 350 |
|---|---|---|---|---|---|---|
| l | 0 | 0.410 | 1.348 | 2.643 | 5.425 | 10.053 |

As shown above, the converging movable lens group moves backward as the distance to the object decreases.

Next, the lens arrangement designed to meet the above mentioned conditions $0.7f < f_3 < 2f$ and $0.8 |f_2| < f_2 < 4 |f_1|$ operates in the following manner:

When the lower limit of $0.7f < f_3 < 2f$ is exceeded, the power of the stationary converging lens group 3 becomes excessively strong while, in relation thereto, the power of the diverging lens group 1 and converging movable lens group 2 becomes weaker. This results in a degraded focusing efficiency. Then, when the upper limit of it is exceeded, the ratio of the power of the converging lens group 3 to the whole power of the front lens part decreases while, contrary to this, the power of the diverging lens group 1 and converging movable lens group 2 becomes stronger. Then, this not only makes the diameter of the front lens larger but also causes variation in the incident height of the light incident upon the diverging lens group 1 and that of the converging movable lens group 2 when focusing is made and, as a result of that, the variation in aberration becomes no longer negligible.

In the case of $0.8 |f_1| < f_2 < 4 |f_1|$, when the lower limit is exceeded, the image forming lateral magnification of the converging movable lens comes to close to 1. This eventually degrades efficiency in focusing. Then, when the upper limit is exceeded causing increase in the focal distance, the power becomes weaker resulting in a degraded efficiency of the focusing operation.

Figure 5:
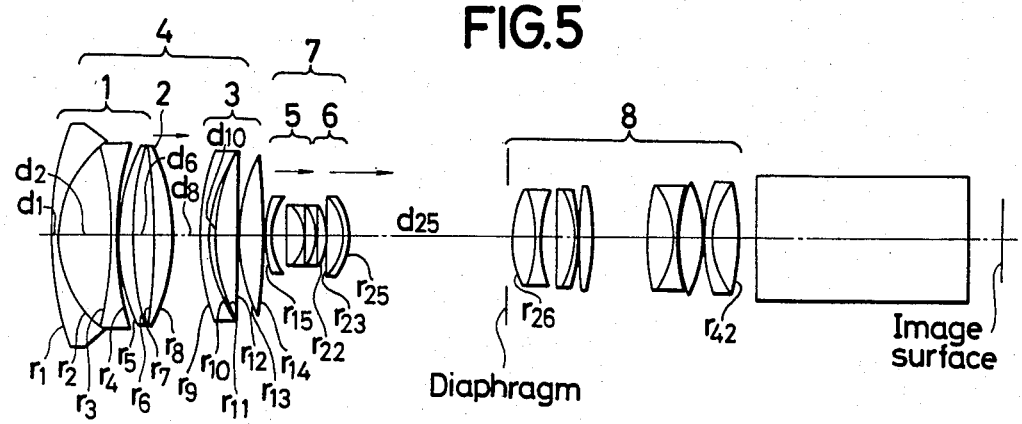
FIG. 5 is a sectional view of lenses illustrating an embodiment of the invention.

FIG. 5 illustrates an embodiment of this invention. In this embodiment, the front lens part disposed in front of a zoom part 7 and a stationary image forming lens group 8 comprises a diverging lens group 1 which is composed of a negative meniscus lens having its convex surface positioned to face forward, a concavo-concave lens and a positive meniscus lens with its convex surface facing forward; a converging movable lens group 2 with its convex surface positioned to face backward; and a converging lens group 3 which is composed of a positive lens formed by joining a negative meniscus lens and a positive meniscus lens together with its convex surface facing forward and a convexoconvex lens.

The lens data are as shown in the following list, wherein r represents radius of curvature, d distance between lens faces on the axis, n a refractive index and ν and Abbe's number:

| | r | d | n | ν |
|---|---|---|---|---|
| 1 | 108.33 | 2.20 | 1.69680 | 55.5 |
| 2 | 39.89 | 18.59 | | |
| 3 | −133.94 | 2.20 | 1.64000 | 60.2 |
| 4 | 104.06 | 0.20 | | |
| 5 | 63.58 | 5.42 | 1.75520 | 27.5 |
| 6 | 119.05 | 6.93 | | |
| 7 | −256.15 | 6.05 | 1.64000 | 60.2 |
| 8 | −71.72 | 9.98 | | |
| 9 | 91.28 | 2.00 | 1.84666 | 23.9 |
| 10 | 44.17 | 0.30 | | |
| 11 | 45.31 | 10.70 | 1.64000 | 60.2 |
| 12 | 10744.54 | 0.20 | | |
| 13 | 61.85 | 8.20 | 1.64000 | 60.2 |
| 14 | −341.47 | $d_{14}$ | | |
| 15 | 49.11 | 1.00 | 1.77250 | 49.7 |
| 16 | 18.10 | 6.73 | | |
| 17 | −95.90 | 5.00 | 1.51118 | 51.0 |
| 18 | −15.39 | 0.80 | 1.77250 | 49.7 |
| 19 | 107.35 | 3.29 | | |
| 20 | −18.40 | 0.80 | 1.69680 | 55.5 |
| 21 | 171.64 | 2.74 | 1.92286 | 21.3 |
| 22 | −42.33 | $d_{22}$ | | |
| 23 | −205.29 | 5.80 | 1.56873 | 63.1 |
| 24 | −20.12 | 1.30 | 1.80518 | 25.4 |
| 25 | −26.75 | $d_{25}$ | | |
| 26 | 0.00 | 1.20 | | |
| 27 | 39.93 | 8.64 | 1.63980 | 34.6 |
| 28 | −46.85 | 1.40 | 1.77250 | 49.7 |
| 29 | 47.16 | 5.30 | | |
| 30 | 309.50 | 6.54 | 1.48749 | 70.1 |
| 31 | −38.22 | 1.40 | 1.80610 | 40.9 |
| 32 | −79.47 | 0.29 | | |
| 33 | 432.87 | 4.43 | 1.51633 | 64.1 |
| 34 | −89.34 | 18.40 | | |
| 35 | 92.89 | 8.80 | 1.48749 | 70.1 |
| 36 | −31.68 | 1.50 | 1.80610 | 40.9 |
| 37 | 79.14 | 0.30 | | |
| 38 | 57.15 | 8.69 | 1.51633 | 64.1 |
| 39 | −46.05 | 0.20 | | |
| 40 | 56.22 | 1.40 | 1.77250 | 49.7 |
| 41 | 26.29 | 10.76 | 1.51633 | 64.1 |
| 42 | −87.86 | 6.00 | | |
| 43 | 0.00 | 72.60 | 1.51633 | 64.1 |
| 44 | 0.00 | 6.23 | | |

| wide-angle end | Telephoto end |
|---|---|
| $d_{14} = 0.93 \sim$ | 54.7 |
| $d_{22} = 0.63 \sim$ | 0.56 |
| $d_{25} = 54.94 \sim$ | 1.2 |

The advantages of this invention will become more apparent from the following comparison of the invented lens system with the conventional systems: According to the most popular conventional practice, a focusing operation is accomplished by drawing out the foremost lens group. Whereas, in accordance with this invention, it is only an inner lens group that is moved for focusing. The so-called pumping effect does not take place as there is caused no air flow into and out of the lens barrel.

Therefore, dust is prevented from entering the lens barrel. Compared with the conventional type of device drawing out the front lens, the weight of the movable group is reduced because, in accordance with this invention, only a middle lens group in the front lens part is movable. Also, the lens barrel is not arranged to extend and contract. This permits simplification of the construction.

Figure 6:
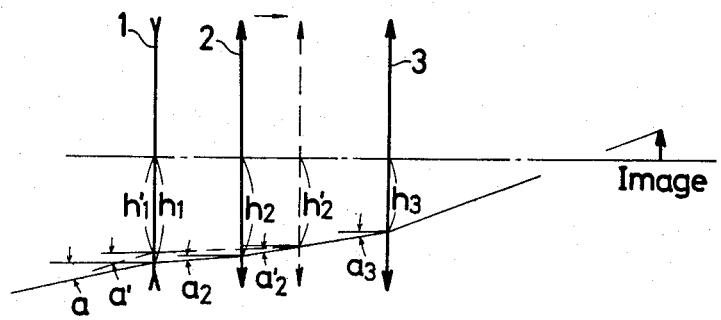
FIG. 6 illustrates the front lens part of the embodiment of the invention showing the advantages thereof.
Figure 7:
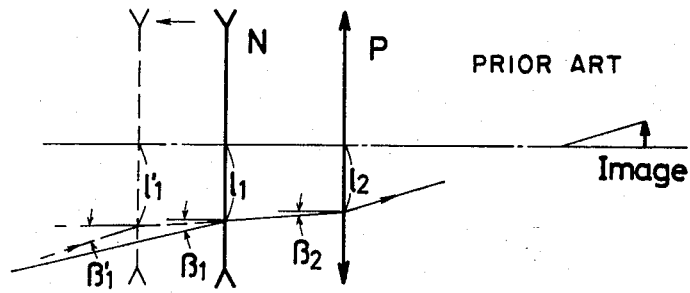
FIG. 7 illustrates a conventionally known front lens for comparison with this invention.

Further, in accordance with this invention, a focusing operation causes less variation in the angle of field. Referring to FIGS. 6 and 7, with the size of an image set unvaried, the angle of field varies as a result of a focusing operation. In the case of the conventional front-mounted diverging lens group N as illustrated in FIG. 7, when focusing is made by moving the group N toward an object, the incident height $l_2$ of the chief ray in the stationary convergent lens group P and its angle $\beta_2$ to the optical axis are unvaried. However, the incident height $l_1$ of a chief ray passing across the first diverging lens group N and its angle $\beta_1$ to the optical axis respectively increase in such a way as $l_1 < l_1'$ and $\beta_1 \beta_1'$. Here, the variation in $\beta_1$ emerges in the form of variation in the angle of field.

Figure 8:
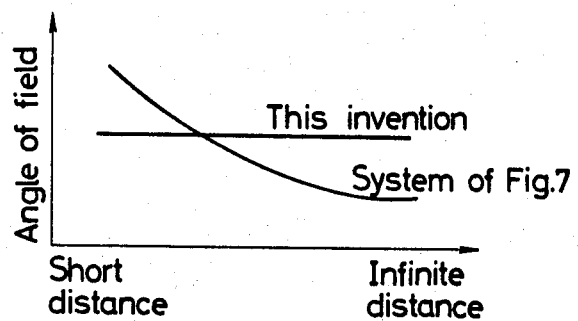
FIG. 8 illustrates difference between this invention and the example of the conventionally known lenses.

In the case of the front lens part of this invention as illustrated in FIG. 6, when a focusing operation is made from an infinite distance to a near distance condition, the height of a chief ray passing across the converging lens group 2 decreases in such a way as $h_2 > h_2'$ while its angle to the optical axis increases in such a way as $\alpha_2 < \beta_2'$. The height of the chief ray which passes across the diverging lens group 1 decreases, $h_1 > h_1'$, and its angle to the optical axis decreases $\alpha_1 > \alpha_1'$. The variation of $\alpha_1$ then becomes variation in the angle of field. However, this variation takes place to a lesser degree in the invented front lens part than in the above mentioned conventional front lens part. Such difference is qualitatively illustrated in FIG. 8.

Since the foremost lens group is stationary, the lens diameter can be made smaller than the system of the type to draw out a lens group. This permits reduction in the lens size and weight.

For aberration correction, it is preferable that focusing can be made with the lens group moved to the least possible degree. Therefore, the focal distance of the diverging lens group of this invention is preferably made shorter than the conventional method of moving a diverging lens group toward an object.

As apparent from FIG. 6, in accordance with the method of this invention, the converging movable lens group 2 is moved backward as the position of the focusing object changes from an infinite distance to a nearer distance. With such a method employed, the height of the chief ray passing the diverging lens group 1 and the converging lens group 2, under a near distance condition, is less than the height at which the chief ray passes across these groups under an infinite distance condition ($h_1' < h_1, h_2' < h_2$). Therefore, the aberrations that take place under these conditions act to offset each other to ensure less aberration variation during a focusing operation.

What is claimed is:

1. A zoom lens capable of preventing aberration variation for focusing which comprises:

a front lens part which consists of, from the object side, a first fixed lens group, a movable lens group and a second fixed lens group and which possesses a positive refractive power irrespective of the position of the movable lens group, the first fixed lens group having a negative refractive power while both the movable lens group and the second fixed lens group having positive refractive powers; for re-focusing from a distant object onto a near object, the movable lens group moves in the direction of an image of the object;

a zooming lens part which is provided with at least two movable lens groups, the zooming lens part being disposed on the image side of said front lens part; and an image forming lens group disposed on the image side of said zooming lens part.

2. A zoom lens according to claim 1, wherein said movable lens group includes a positive meniscus lens disposed with its concave face facing the object.

3. A zoom lens according to claim 1, wherein said first fixed lens group consists of a negative meniscus lens the convex face of which is disposed to face the object, a bi-concave lens and a positive meniscus lens the convex face of which is disposed to face the object; said movable lens group consists of a positive meniscus lens the concave face of which is disposed to face the object; and said second fixed lens group consists of a negative meniscus lens the convex face of which is disposed to face the object, a positive meniscus lens the convex face of which is also disposed to face the object and a bi-convex lens.

4. A zoom lens as in claim 1, wherein said movable lens group of the front lens part has a magnifying power at any position within its movable range.

* * * * *